(12) United States Patent
Meunier (10) Patent No.: US 12,140,085 B2
(45) Date of Patent: Nov. 12, 2024

(54) SYSTEM AND METHOD FOR DETECTING AND ACCOMMODATING LOSS OF TORQUE ON GAS TURBINE ENGINES

(71) Applicant: PRATT & WHITNEY CANADA CORP., Longueuil (CA)

(72) Inventor: Gabriel Meunier, Saint-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 407 days.

(21) Appl. No.: 16/851,863

(22) Filed: Apr. 17, 2020

(65) Prior Publication Data

US 2021/0324805 A1 Oct. 21, 2021

(51) Int. Cl.
*G01M 15/14* (2006.01)
*F01D 21/14* (2006.01)
*F02C 9/26* (2006.01)

(52) U.S. Cl.
CPC ............... *F02C 9/26* (2013.01); *F01D 21/14* (2013.01); *G01M 15/14* (2013.01); *F05D 2270/024* (2013.01); *F05D 2270/304* (2013.01); *F05D 2270/335* (2013.01); *F05D 2270/708* (2013.01)

(58) Field of Classification Search
CPC .. B60W 10/06; F05B 2270/335; F01D 21/14; F02C 9/26; F02C 9/58; F05D 2220/32; F05D 2240/35; F05D 2260/80; F05D 2270/02; F05D 2270/024; F05D 2270/053; F05D 2270/304; F05D 2270/335; F05D 2270/708; G01M 15/14
See application file for complete search history.

(56) References Cited

U.S. PATENT DOCUMENTS

| | | | |
|---|---|---|---|
| 6,840,734 B2 | 1/2005 | Hansen | |
| 10,480,423 B2 | 11/2019 | Liacu | |
| 11,421,606 B2 * | 8/2022 | Lamarre | F02C 9/46 |
| 11,739,656 B2 * | 8/2023 | Calderon | F01D 21/14 |
| | | | 701/100 |
| 2014/0121871 A1 | 5/2014 | Kim | |
| 2018/0320598 A1 * | 11/2018 | Lamarre | G05B 19/355 |
| 2019/0032577 A1 * | 1/2019 | Cipolla | B64C 11/30 |

(Continued)

OTHER PUBLICATIONS

Fault. (2010). In S. M. H. Collin (Ed.), Dictionary of computing (6th ed.). Bloomsbury. Credo Reference: https://search.credoreference.com/content/entry/acbcomp/fault/0?institutionId=743 (Year: 2010).*

*Primary Examiner* — Alvaro E Fortich
*Assistant Examiner* — Martin Walter Braunlich
(74) *Attorney, Agent, or Firm* — Norton Rose Fulbright Canada LLP (57) ABSTRACT

Methods and system for operating a gas turbine engine are described. The method comprises determining an actual engine output power based on a torque of the gas turbine engine, comparing the actual engine output power to an estimated engine output power to obtain an error, obtaining an actual engine speed and biasing the actual engine speed using the error to produce a biased engine speed, determining the estimated engine output power using a model-based estimator having the biased engine speed as input, detecting a torque-related fault based on the error and a first threshold, and accommodating the torque-related fault in response to detecting the torque-related fault.

18 Claims, 5 Drawing Sheets

(56) References Cited

U.S. PATENT DOCUMENTS

| | | | |
|---|---|---|---|
| 2019/0071172 A1* | 3/2019 | Caldwell | B64C 27/08 |
| 2020/0088109 A1* | 3/2020 | Tang | F02C 7/057 |
| 2020/0095933 A1* | 3/2020 | Tang | F04D 27/002 |

* cited by examiner

SYSTEM AND METHOD FOR DETECTING AND ACCOMMODATING LOSS OF TORQUE ON GAS TURBINE ENGINES

TECHNICAL FIELD

The present disclosure relates generally to gas turbine engines, and more particularly to detecting and accommodating a loss of torque signal on gas turbine engines.

BACKGROUND OF THE ART

Turboshaft and turboprop engines for aircraft use a torque signal for governing either on torque or on power. In the unlikely event that the torque signal is lost, it is desirable for engine control systems to be designed so that engine control is maintained. As such, there is a need for improvement.

SUMMARY

In accordance with a broad aspect, there is provided a method for operating a gas turbine engine. The method comprises determining an actual engine output power based on a torque of the gas turbine engine, comparing the actual engine output power to an estimated engine output power to obtain an error, obtaining an actual engine speed and biasing the actual engine speed using the error to produce a biased engine speed, determining the estimated engine output power using a model-based estimator having the biased engine speed as input, detecting a torque-related fault based on the error and a first threshold, and accommodating the torque-related fault in response to detecting the torque-related fault.

In accordance with another broad aspect, there is provided a system for operating a gas turbine engine. The system comprises a processing unit and a non-transitory computer readable medium having stored thereon program instructions. The program instructions are executable by the processing unit for determining an actual engine output power based on a torque of the gas turbine engine, comparing the actual engine output power to an estimated engine output power to obtain an error, obtaining an actual engine speed and biasing the actual engine speed using the error to produce a biased engine speed, determining the estimated engine output power using a model-based estimator having the biased engine speed as input, detecting a torque-related fault based on the error and a first threshold, and accommodating the torque-related fault in response to detecting the torque-related fault.

Features of the systems, devices, and methods described herein may be used in various combinations, in accordance with the embodiments described herein. More particularly, any of the above features may be used together, in any combination.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There are described herein methods and systems for detecting and accommodating a torque-related fault, such as a torque signal failure, drift, or fast signal variation on gas turbine engines. A torque signal is used by a control system to govern a gas turbine engine. In the unlikely event where the torque signal is lost or erroneous, the control system is configured to detect the fault and accommodate the fault. Detection of a torque-related fault is based on estimating the engine output power using a feedback architecture that allows various phenomenon that can create a bias on the relationship between engine output power and engine speed to be taken into account.

Figure 1:
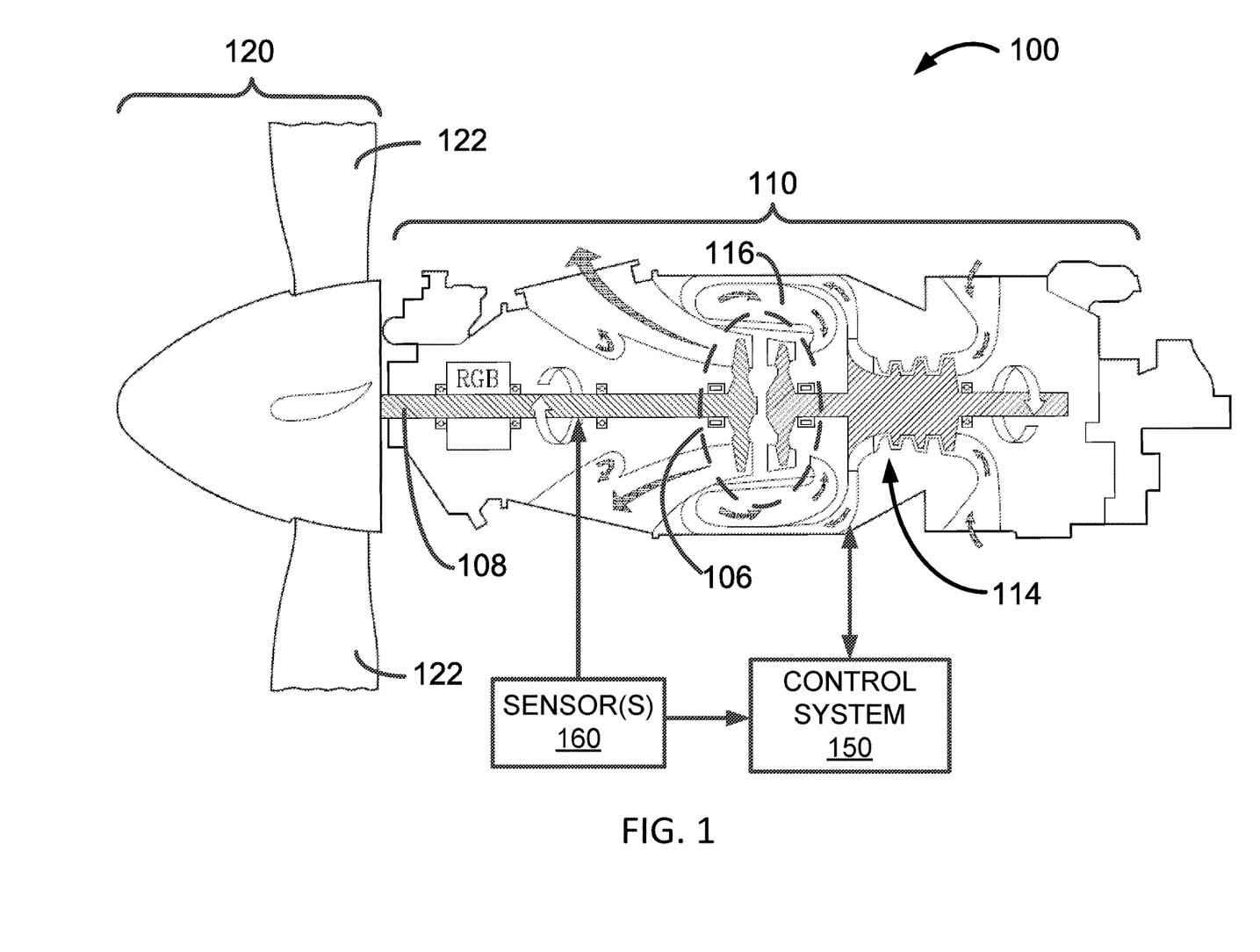
FIG. 1 is a schematic cross-sectional view of an example gas turbine engine.

FIG. 1 illustrates a powerplant 100 for an aircraft of a type provided for use in subsonic flight, generally comprising an engine 110 and a propeller 120. The powerplant 100 generally comprises, in serial flow communication, the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases. The propeller 120 converts rotary motion from the shaft 108 of the engine 110 to provide propulsive force, for example for an aircraft, also known as thrust. The propeller 120 comprises two or more propeller blades 122. A blade angle of the blades 122 may be adjusted. The blade angle may be referred to as a beta angle, an angle of attack or a blade pitch. The powerplant 100 may be implemented to comprise a single or multi-spool gas turbine engine, where the turbine section 106 is connected to the propeller 120 through a reduction gearbox (RGB).

Although illustrated as a turboprop engine, the powerplant 100 may alternatively be another type of engine, for example a turboshaft engine, also generally comprising in serial flow communication a compressor section, a combustor, and a turbine section, and a fan through which ambient air is propelled. In addition, although the powerplant 100 is described herein for flight applications, it should be understood that other uses, such as industrial or the like, may apply.

Control of the operation of the engine 110 can be effected by one or more control systems, for example control system 150. The control system 150 may be an engine controller, such as a Full Authority Digital Engine Control (FADEC), an Engine Electronic Control (EEC), an Engine Control Unit (ECU) or the like. In some embodiments, the control system 150 may be a combined engine and propeller controller, such as an Engine & Propeller Electronic Control (EPEC). The control system 150 can modulate a fuel flow provided to the engine 110, the position and/or orientation of variable geometry mechanisms within the engine 110, a bleed level of the engine 110, and the like.

The control system 150 modulates fuel flow to the engine 110 in order to obtain a desired output power. In regular operation, fuel flow may be managed in a closed-loop, such that a given output parameter of the engine 110 is measured and fuel flow is increased or decreased as a function of the measured parameter in order to increase or decrease, respectively, the output power of the engine 110. For example, when governing on torque or power in a closed-loop, the torque or power of the engine 110 is determined using one or more sensor(s) 160. Power may be determined by multiplying torque by propeller speed (Q×NP). The sensor(s) 160 may comprise torque sensors to measure torque directly from the shaft 108 of the engine 110. The sensor(s) 160 may comprise speed sensors or accelerometers to measure speed/acceleration from the shaft 108 and torque may be calculated from the measurements. Other embodiments for obtaining the torque of the engine 110 may also be used.

In certain instances, the torque signal obtained from the sensor(s) 160 may be lost or erroneous. The control system 150 is configured to detect these circumstances by comparing an actual engine output power to an estimated (or expected) output power. The estimated output power is determined based on one or more predicted relationships between engine core speed and engine power. The precision of the detection method may thus depend on the precision of the relationship between engine core speed and engine power, which is modeled and used for the detection. This relationship can be affected by various phenomenon, such as but not limited to bleed extraction, generator load, compressor deterioration, turbine deterioration, and the like. Such phenomenon generally cannot be modeled adequately, which may create an undesired offset in the estimation of output power.

Figure 2:
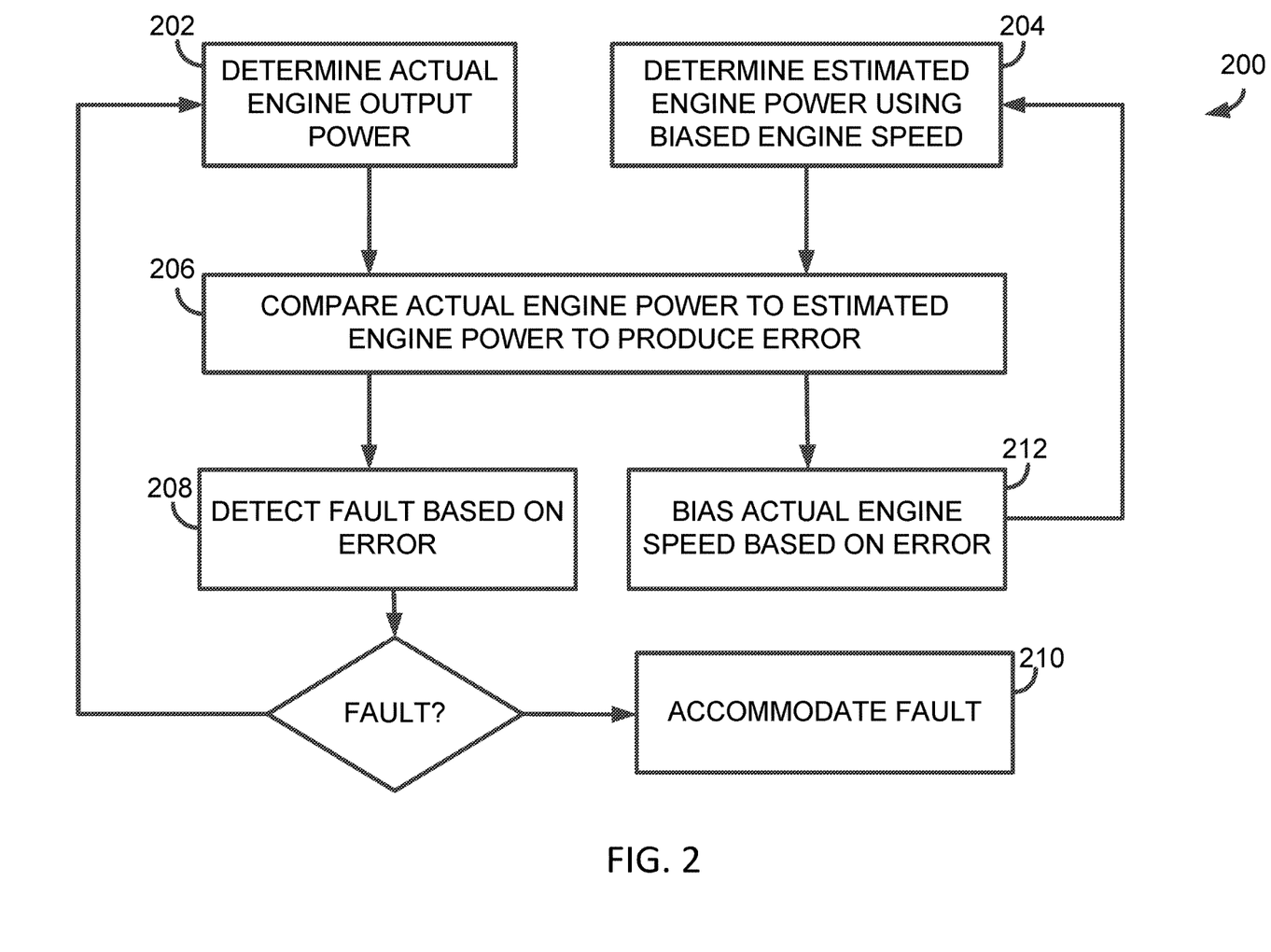
FIG. 2 is a flowchart of an example method for operating a gas turbine engine.

An example method 200 for operating a gas turbine engine, such as engine 110, is illustrated in the flowchart of FIG. 2. At step 202, an actual engine power is determined based on a measured or calculated torque of the engine. For example, sensor(s) 160 may be used to obtain a torque measurement, and the actual engine power may be determined by multiplying the torque by the speed of the propeller 120.

Figure 3:
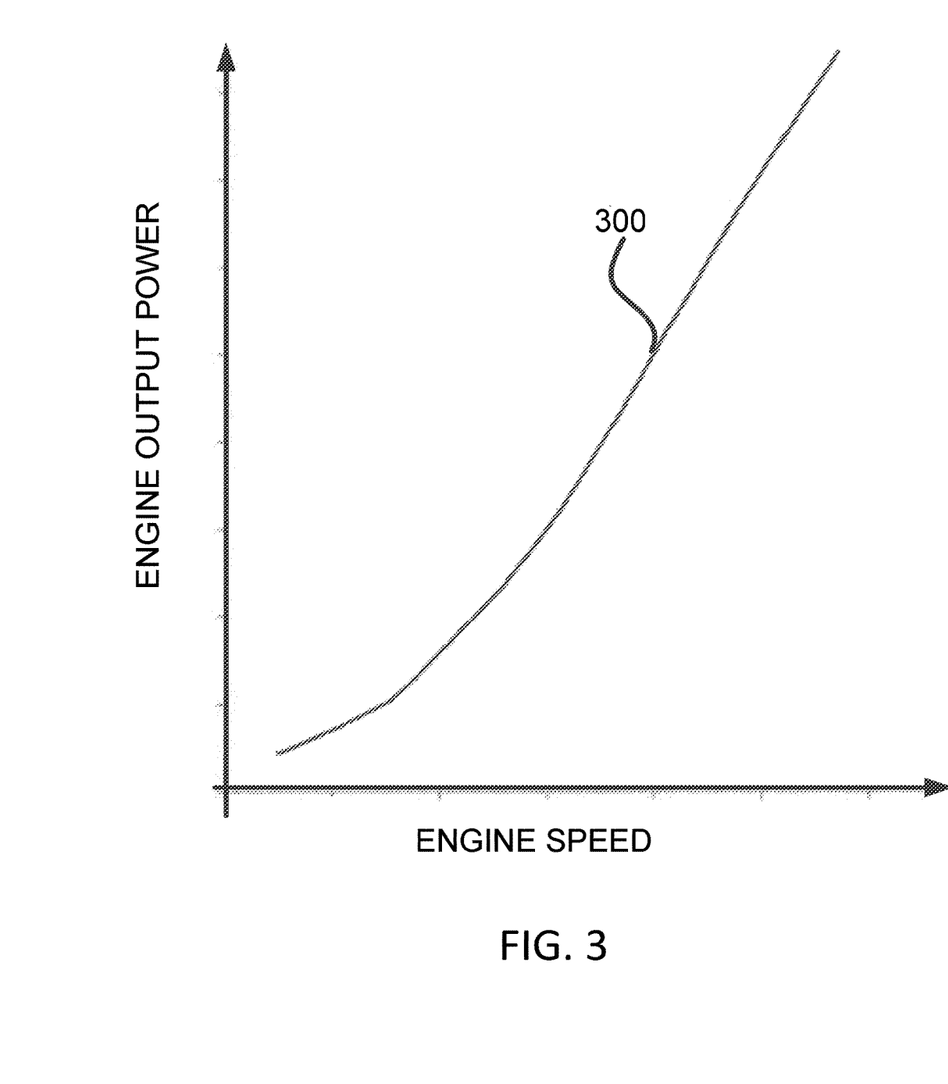
FIG. 3 is an example of a relationship between engine output power and engine speed.

At step 204, an estimated engine power is determined. The engine power is estimated using a model-based estimator having engine speed as input. A suitable model may be selected through simulations and/or testing so as to represent the behavior of the engine when in operation, under a given set of operating conditions. An example is illustrated in FIG. 3, where curve 300 maps the engine output power (y-axis) to the engine speed (x-axis). When estimating engine output power, such a curve may be used to find the engine output power that corresponds to an input engine speed. In some embodiments, a plurality of curves 300 are provided, each one corresponding to a different set of operating conditions. Linear interpolation may be performed amongst the curves as needed, for example using a multi-dimensional look-up table that represents an array of curves that map the operation envelope of the engine.

Referring back to FIG. 2, at step 206, the actual engine output power determined at step 202 is compared to the estimated engine power determined at step 204. The difference between the actual engine power and the estimated engine power produces an error. The error is used to detect a torque-related fault at step 208, based on a threshold. If a fault is detected, the fault is accommodated at step 210.

The error produced at step 206 is also used to bias the actual engine speed at step 212, which is then used in a feedback loop as input to the model-based estimator at step 204. Therefore, the estimated engine power is determined using the biased engine speed. It is the measured or calculated engine speed (i.e. actual engine speed) that is biased (or offset) in order to determine the estimated engine power.

In some embodiments, accommodating the fault means logging the fault for maintenance purposes. In some embodiments, accommodating the fault means communicating the fault to the pilot. For example, the fault may be annunciated in the cockpit using one or more discrete switches, ARINC, a message on a cockpit display, and/or other suitable alerting mechanisms visible to the pilot or an aircraft operator. In some embodiments, accommodating the fault means governing the gas turbine engine based on the estimated engine output power instead of based on the measured engine output power. In some embodiments, accommodating the fault means using a synthesized torque signal to replace the loss of the torque signal. Other embodiments for accommodating the fault may apply, as will be readily understood by those skilled in the art.

Figure 4:
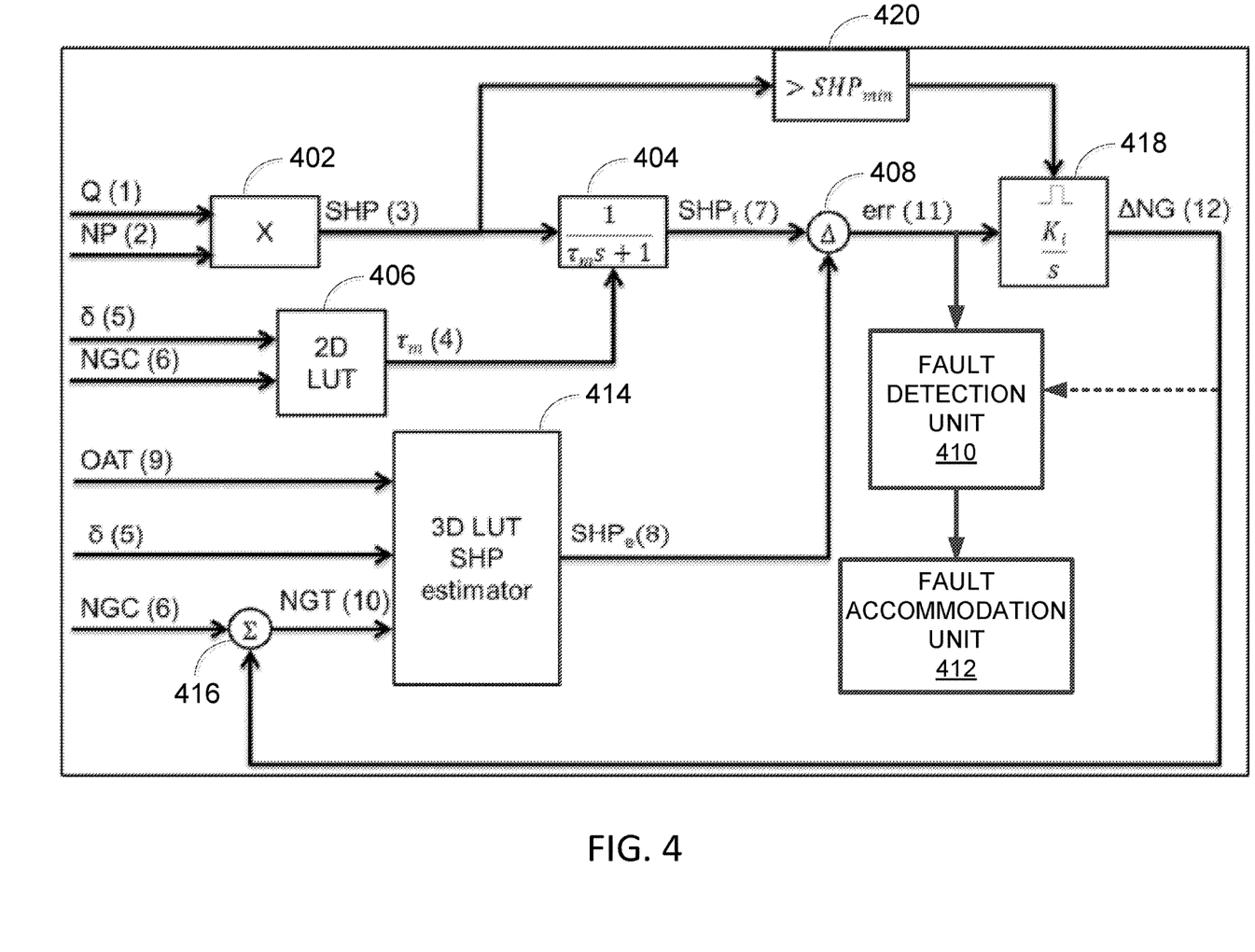
FIG. 4 is a schematic block diagram showing an architecture for implementing the method of FIG. 2.

A specific and non-limiting example for implementing the method 200 will be described with reference to FIG. 4. Torque (Q) and propeller speed (NP) are received at a multiplier 402 and an actual engine output power (SHP) is output therefrom. Torque and propeller speed may be received directly from sensors 160 or may be obtained indirectly through other parameters.

In some embodiments, a lag is applied to the actual engine output power, for example using the filter 404. Filter 404 is a first order filter having a time constant $\tau_m$ derived from an engine model represented by the lookup table 406. A filter of higher order may also be used. Both the engine output power and the engine speed react to an input perturbation (i.e. the fuel flow provided to the engine), but with different lag times. The filter 404 is designed to reproduce the lag coming from the inertia of the gas generator of the engine, such that the lag applied to the engine output power (SHP) aligns the engine output power with the gas generator speed. As such, the lookup table 406 receives as input a corrected gas generator speed (NGC) as well as an altitude ratio ($\delta$) and outputs the time constant $\tau_m$. Altitude ratio is a ratio of a current ambient pressure over a standard reference ambient pressure. It is used as a measured of a pressure altitude of the aircraft. The time constant $\tau_{in}$ is used by the filter to apply the appropriate lag to the actual engine output power SHP to produce a filtered engine output power $SHP_f$. The lookup table 406 may be based on simulations and/or testing in order to select a suitable model. In some embodiments, this filtering step is omitted.

The actual engine output power is compared to an estimated engine output power ($SHP_e$) at the comparator 408 and an error (err) is produced. The error represents the difference between the actual engine output power and the estimated engine output power.

In some embodiments, fault detection is performed by comparing the error signal to a threshold in the fault detection unit 410. A fast signal variation type torque-related fault may be detected by an increase in the power error signal. When detected, the fault may be accommodated by the fault accommodation unit 412 as described above.

The estimated engine output power ($SHP_e$) is generated by the model-based estimator 414, which may be represented as a lookup table. In some embodiments, the lookup table is a 3D lookup table and takes as input outside air temperature (OAT), altitude ratio ($\delta$), and a biased engine speed (NGT). Other inputs may also be used, such as inlet air temperature and aircraft speed (calibrated airspeed or MACH number). The biased engine speed (NGT) is produced by adding the measured engine speed (NGC) to a delta engine speed ($\Delta$NG) at a summer 416. The delta engine speed ($\Delta$NG) is based on the error produced by comparing the actual output engine power with the estimated engine output power. The error is integrated using an integrator 418 with a gain $K_i$. The integrator 418 represents any hardware or software that may be used to integrate the signal. Through the integrator 418, the error produced is accumulated over a defined time to produce a representative output that gets added to the measured engine speed to obtain the biased engine speed. The biased engine speed is then used as input to the estimator 414 to obtain the estimated engine output power. This allows the estimated engine output power to be aligned or trimmed to the actual engine output power in steady state, since the integrator gain $K_i$ is chosen to converge over a relatively large amount of time. The integrator gain $K_i$ is chosen to establish a certain balance between a failure detection capability and a robustness to incorrect detection. The actual value depends on specific objectives of the application. If $K_i$, is too strong, the estimated engine output power and actual engine output power may converge too quickly and prevent detection. If $K_i$ is too weak, the estimated engine output power and actual engine output power may exceed detection threshold without an actual failure. The objective is to properly strike this balance for a given application. Tests and/or simulations may be used to find the proper value.

In some embodiments, the integrator 418 is enabled through a comparator 420, which compares the engine output power to a minimum threshold ($SHP_{min}$). If the engine output power is below the minimum threshold, the integrator 418 is disabled. The estimator 414 would then use as input the measured engine speed without bias or with a last applied bias. If the engine output power is above the minimum threshold, the integrator 418 is enabled and the biased engine speed is input to the estimator 414.

In some embodiments, the fault detection unit 410 receives as input the delta engine speed value. This may be received instead of or in addition to receiving as input the error value. Indeed, fault detection may be performed by comparing the delta engine speed to a threshold and detecting an increase in delta engine speed beyond the threshold. This type of torque-related fault may be referred to as a slow drift or freeze of the torque signal. The threshold may be selected to correspond to a delta NG value that cannot be reached in normal operation and will be reached only under failure conditions. When detected, the fault may be accommodated by the fault accommodation unit 412.

Figure 5:
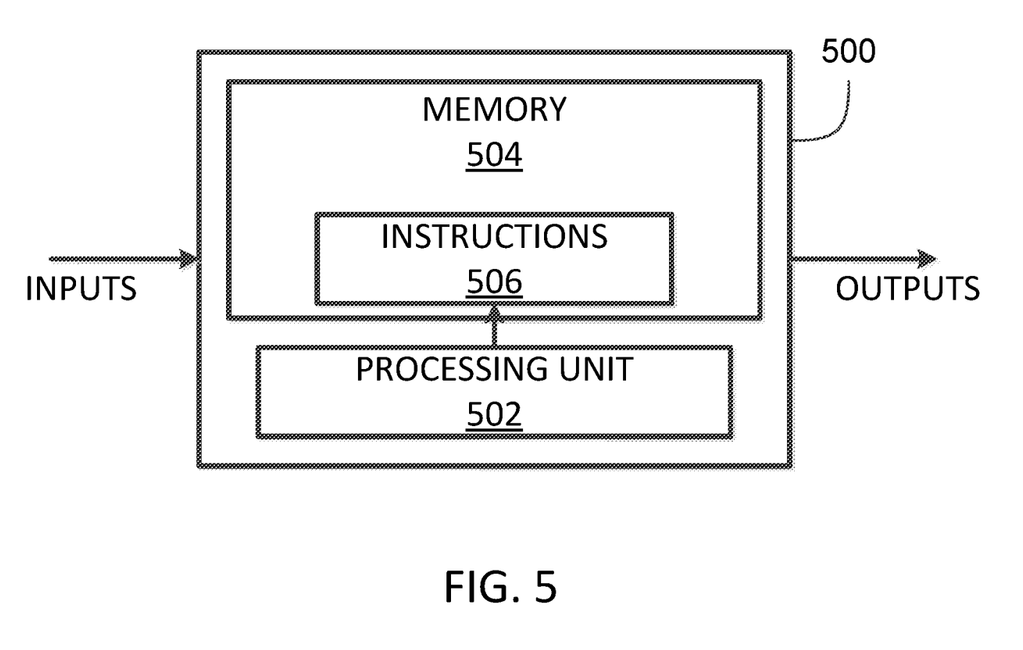
FIG. 5 is a block diagram of an example computing device for implementing the method of FIG. 2.

With reference to FIG. 5, an example of a computing device 500 is illustrated. The control system 150 may be implemented with one or more computing devices 500. Note that the control system 150 can be implemented as part of a full-authority digital engine controls (FADEC) or other similar device, including electronic engine control (EEC), engine control unit (ECU), electronic propeller control, propeller control unit, and the like. Other embodiments may also apply.

The computing device 500 comprises a processing unit 502 and a memory 504 which has stored therein computer-executable instructions 506. The processing unit 502 may comprise any suitable devices configured to implement the method 400 such that instructions 506, when executed by the computing device 500 or other suitable apparatus, may cause the functions/acts/steps performed as part of the method 200 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for detecting and accommodating a torque-related fault described herein may be implemented in a high level procedural or object oriented programming or scripting language, or a combination thereof, to communicate with or assist in the operation of a computer system, for example the computing device 500. Alternatively, the methods and systems for detecting and accommodating a torque-related fault may be implemented in assembly or machine language. The language may be a compiled or interpreted language. Program code for implementing the methods and systems for detecting and accommodating a torque-related fault may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting and accommodating a torque-related fault may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and pre-defined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, a wear-level for the engine may also be used as input for the estimator to determine the estimated engine output power. Yet further modifications could be implemented by a person of ordinary skill in the art in view of the present disclosure, which modifications would be within the scope of the present technology.

The invention claimed is:

1. A method for operating a gas turbine engine, the method comprising:

measuring a sensed output torque of the gas turbine engine;

determining an actual engine output power based on the sensed output torque of the gas turbine engine;

governing the gas turbine engine in a closed loop based on the actual engine output power to obtain a desired output power from the gas turbine engine;

determining an estimated engine output power using a model-based estimator using outside air temperature, a biased engine speed of the gas turbine engine and an altitude ratio as inputs to the model-based estimator;

comparing the actual engine output power to the estimated engine output power to obtain an error;

detecting a fault in the sensed output torque based on the error and a first threshold, the fault including a signal indicative of the sensed output torque being lost or erroneous; and accommodating the fault in the sensed output torque in response to detecting the fault in the sensed output torque by governing the gas turbine engine based on the estimated engine output power instead of based on the actual engine output power to obtain the desired output power from the gas turbine engine.

2. The method of claim 1, comprising biasing an actual engine speed using the error by integrating the error to obtain a delta engine speed and adding the delta engine speed to the actual engine speed to produce the biased engine speed.

3. The method of claim 2, wherein the error is integrated when the actual engine output power is above a second threshold.

4. The method of claim 1, further comprising applying a lag to the actual engine output power to align the actual engine power to the actual engine speed.

5. The method of claim 4, wherein applying the lag comprises applying a first order filter to the actual engine output power.

6. The method of claim 5, wherein the first order filter has a time constant scheduled as a function of altitude ratio and the actual engine speed.

7. The method of claim 1, wherein the model-based estimator is a three-dimensional lookup table.

8. The method of claim 2, wherein the fault in the sensed output torque includes a slow drift or signal freeze from an increase in the delta engine speed beyond the first threshold.

9. The method of claim 1, wherein the fault in the sensed output torque includes an increase in the error beyond the first threshold.

10. A system for operating a gas turbine engine, the system comprising:

a sensor measuring a sensed output torque of the gas turbine engine;

a processing unit; and a non-transitory computer readable medium having stored thereon program instructions executable by the processing unit for:

determining an actual engine output power based on the sensed output torque of the gas turbine engine;

determining an estimated engine output power using a model-based estimator using outside air temperature, a biased engine speed of the gas turbine engine and an altitude ratio as inputs;

governing the gas turbine engine in a closed loop based on the actual engine output power to obtain a desired output power from the gas turbine engine;

comparing the actual engine output power to the estimated engine output power to obtain an error;

detecting a fault in the sensed output torque based on the error and a first threshold, the fault including a signal indicative of the sensed output torque being lost or erroneous; and accommodating the fault in the sensed output torque in response to detecting the fault in the sensed output torque by governing the gas turbine engine based on the estimated engine output power instead of based on the actual engine output power to obtain the desired output power from the gas turbine engine.

11. The system of claim 10, wherein the program instructions executable by the processing unit for biasing an actual engine speed by integrating the error to obtain a delta engine speed and adding the delta engine speed to the actual engine speed to produce the biased engine speed.

12. The system of claim 11, wherein the error is integrated when the actual engine output power is above a second threshold.

13. The system of claim 10, further comprising applying a lag to the actual engine output power to align the actual engine power to the actual engine speed.

14. The system of claim 13, wherein applying the lag comprises applying a first order filter to the actual engine output power.

15. The system of claim 14, wherein the first order filter has a time constant scheduled as a function of altitude ratio and the actual engine speed.

16. The system of claim 10, wherein the model-based estimator is a three-dimensional lookup table.

17. The system of claim 11, wherein the fault in the sensed output torque includes a slow drift or signal freeze from an increase in the delta engine speed beyond the first threshold.

18. The system of claim 10, wherein the fault in the sensed output torque includes an increase in the error beyond the first threshold.

* * * * *